A. DOBLE.
LIQUID FUEL BURNING APPARATUS.
APPLICATION FILED DEC. 7, 1916.

1,313,525. Patented Aug. 19, 1919.
7 SHEETS—SHEET 7.

Fig. 8.

Witnesses:
Maurice Goedberger
E. H. Clegg

Inventor:
Abner Doble.
by: Charles C. Buckley
Atty.

UNITED STATES PATENT OFFICE.

ABNER DOBLE, OF DETROIT, MICHIGAN, ASSIGNOR, BY MESNE ASSIGNMENTS, TO DOBLE-DETROIT STEAM MOTORS CO., OF DETROIT, MICHIGAN, A CORPORATION OF DELAWARE.

LIQUID-FUEL-BURNING APPARATUS.

1,313,525.  Specification of Letters Patent.  Patented Aug. 19, 1919.

Application filed December 7, 1916. Serial No. 135,712.

*To all whom it may concern:*

Be it known that I, ABNER DOBLE, a citizen of the United States of America, and resident of Detroit, Wayne county, Michigan, have invented a certain new and useful Improvement in Liquid-Fuel-Burning Apparatus, of which the following is a specification.

My invention relates to fuel-burning apparatus, more particularly to that class which is employed in the power plants of steam-propelled automobiles, motor boats and the like.

In automobiles, motor boats and the like, power-propelled vehicles of the type in which steam is employed as the energizing force and liquid-fuel for the generation of the steam, it is the practice to first vaporize the fuel. Because of the type of fuel-burning apparatus heretofore employed, this preliminary vaporization has been a source of objection to the steam-propelled automobile, not only in that extreme care must be exercised by the operator in the manipulation of the vaporizing apparatus and in ascertaining that the fuel is completely vaporized before being applied to the burner and ignited, but in the actual danger due to explosion and back-firing.

The object of my invention is to eliminate these various objections and difficulties by the provision of improved fuel-burning apparatus to bring about the preliminary vaporization and complete combustion of the fuel in the minimum period of time, and without any possibility of explosion and back-firing, and without the exercise of any particular care on the part of the operator.

Other objects of my invention will appear hereinafter.

In the drawings, I illustrate various modified structures which embody my invention.

Referring to the drawings:—

The apparatus which is illustrated in the drawings, and in connection with which I will describe my invention, is designed and intended for use in automobile power plants for the purpose of supplying heat to a steam boiler or generator, and for this reason I have shown my improved burner apparatus in its operative relation to a steam boiler or generator of the type which constitutes the subject-matter of my co-pending application, Serial No. 121,802, filed September 23, 1916, hence a brief description of the boiler will serve to better illustrate the manner of application of my invention to an automobile steam plant. However, it will be obvious to one skilled in the art, after having obtained an understanding of my invention from the disclosures herein made, that my invention may as readily be applied to plants other than automobile plants, and in fact it may be applied to stationary steam plants without departing from the scope and spirit of the invention, and I wish it to be so understood.

This steam boiler or generator comprises in general a suitable rectangular casing or shell A having a suitable insulating lining for retaining the heat within the casing. Within this casing is contained a plurality of vertically disposed tubes 1 which are arranged in unit parallel rows, each row having an upper header 2 and a lower header $2^a$ common to the tubes of the row, and which, together with the tubes of the row, form unit integral sections. The tubes and their lower headers are spaced apart to provide for the passage of the heat and products of combustion from the burner. The headers are connected by short pipes to common manifolds, and in Fig. 1 a portion of the steam manifold $2^b$ is shown. The tube units or sections are arranged in two general divisions or groups B and C, those in the group B constituting the evaporator drying and superheating portion of the generator and constituting the larger group, and those in group C constituting the economizer portion of the boiler which heats the boiler-feed water. The two divisions of tubes are separated within the casing by a refractory wall or partition 3 which terminates short of the top $A^2$ of the casing to provide a passage or communication between the two compartments thus formed in the casing. The heat and products of combustion pass upwardly in the casing along the water tubes in the group B from the burner or heater which is disposed beneath the evaporator portion of the boiler. The water in the tubes is converted into steam and the steam dried and superheated all within the evaporator portion of the boiler. The products of combustion pass over the partition wall and thence downwardly around the tubes in group C, and thereby heat the feed-water in these tubes. At the lower end of the economizer portion of the boiler casing is an outlet funnel or flue D through which the products of combustion eventually pass into the atmosphere. In carrying out my invention, I provide a hearth-member which is entirely unlike the usual types of burners in that it is imperforate, or in other words has no openings through which the combustible fuel-mixture is passed from one side to the other thereof. Instead, the fuel mixture is delivered upon this member or hearth on the same side as that on which the combustion takes place. In other words, the fuel-mixture is delivered into the combustion zone without being passed through openings or perforations in a burner member. This hearth or combustion member may thus properly be said to constitute a hearth or bed upon the surface of which the combustion of the fuel takes place. The hearth member is preferably made of a refractory material capable of withstanding high temperature and capable of being rendered incandescent by the action of the burning mixture, and in this condition thus operates to accelerate and intensify the process of combustion. In order that a suitable and effective combustion zone may be created, the hearth-member takes the form of a rectangular bowl or dish-shaped structure E which is open at its top and which is positioned with its open end to embrace the lower end of the evaporator and superheater portions of the boiler in such manner that the products of combustion will rise from said bowl-shaped hearth directly upwardly into the boiler casing. This bowl-shaped hearth is substantially square, and the upper edge thereof is fitted to the boiler in any suitable manner to prevent the egress of the heat or the entrance of air from the exterior. The burner hearth, while being generally square to conform to the boiler, has its lower corners and angles 4 curved to form a generally rounded interior surface so as to more effectively direct the flow or course of the burning gases within this combustion chamber. Thus a combustion chamber or zone is formed within this bowl-shaped hearth, in which zone the fuel is intensely burned. The fuel-mixture is directed into this combustion zone and against the interior wall or surface of the combustion hearth by means of a fuel-delivery tube or member F which, in several of the structures illustrated in the drawings, extends downwardly from the top of the boiler through the casing and terminates centrally of the combustion-hearth and at the proper distance above the bottom wall thereof. The lower end of the delivery tube is positioned as close to the interior surface of the hearth as is necessary to direct the stream or flow of fuel-mixture against this surface on which the fuel concentrates, so to speak, and burns. I find it of advantage to provide a slightly raised portion or hump 6 in the bottom of the hearth directly in line with the mouth of the delivery-tube. The refractory hearth, particularly its interior surface, quickly becomes highly heated, and by reason of its heated condition it accelerates and intensifies the process of combustion. In order that it will be of maximum effectiveness in this respect, I prefer that the hearth-member, or at least its interior surface, be of a very cellular or roughened or irregular nature, whereby to retard the movement of the fuel gases and retain them longer in the zone of combustion, and further to increase the area of the hearth subject to the heat of combustion. This hearth structure which I have thus described and which constitutes subject-matter involved in my co-pending application Serial No. 140730 filed January 5, 1917, I find most effective for the purpose.

In the various structures illustrated in the drawings, the fuel is vaporized before it enters the combustion zone, and the vaporizer takes the form of a coil of tube or pipe G which is positioned in the combustion chamber adjacent the mouth of the delivery tube where the liquid-fuel thereon will be subject to the heat in the combustion zone. This vaporizing coil has two extensions 10 and 11 rising to the top of the boiler for the purpose of making connection therewith. Also associated with the delivery tube is a fuel-vapor feed-mechanism which controls the flow of vaporized fuel for the main burner flame and for the auxiliary vaporizer flame, this auxiliary burner flame being intended for the purpose of maintaining the fuel in a vaporized condition ready for instant use for the main flame. The liquid-fuel is supplied to the vaporizer and burner mechanism under pressure and a description of this pressure system and the method of regulation thereof is deemed advisable before a detailed explanation of the operation of the vapor-feed mechanism is entered into. The liquid-fuel is contained in a suitable storage tank 12 for convenience and a main pipe line, involving the pipes 13, 14, 15 and 16, extends from the fuel-tank to the vaporizer extension 10. The liquid-fuel is fed to the vaporizer by a suitable pump H interposed in the main pipe line, which pump imposes a comparatively high pressure,—in practice about 150 pounds per square inch,—on the fuel, the pump being driven by the motor which propels the vehicle and being constantly running while said motor is running. This main pipe line also includes an accumulator J which smooths out the effect of the fluctuations of the pump and which operates to sustain the pressure even when the pump is idle. The supply of liquid-fuel to the burner apparatus is controlled by a regulator-valve K which is automatically responsive to boiler conditions and operates, when the steam-pressure in the boiler becomes abnormal, a control-valve J¹ in the main pipe line. This regulator is shown in detail in Fig. 11. The passage through the valve is controlled by a needle valve member 17 which is mounted in a suitable support 18 and is connected to a diaphragm 19 in the diaphragm-chamber 20. This diaphragm is subject to the steam pressure in the boiler and is connected by the pipe 21 with the steam manifold 2ᵇ. The operation of the diaphragm is resisted by the spring 22 and is adjustable by means of the bushing 23 so that the regulator can be adjusted to the desired boiler condition. Thus in the event that the steam pressure becomes too great by reason of the abnormal supply of fuel and the consequent intensity of heat, the regulator will operate to automatically shut off the fuel until the normal conditions are restored, whereupon the flow of fuel will be continued. In the main fuel line, I also provide a hand-valve 24 by which the fuel may be manually shut off when desired. I also provide a by-pass 25 around the manual valve 24 and the automatic regulator K, and this by-pass includes a pressure-reducing valve 26 which may be of any suitable or standard construction. This by-pass and its valve operate to reduce the fuel-pressure to about five pounds and supply just sufficient fuel at this pressure to the auxiliary burner flame when the high pressure-supply is cut off, either normally or automatically as above described. Thus the auxiliary burner flame, which, of course, is comparatively small, has a constant supply of low pressure fuel which keeps it burning for the purpose not only of maintaining fuel vaporization, but for re-igniting the main flame as soon as the supply of fuel is restored thereto. The low-pressure by-pass also has a manual valve 27 for use when the auxiliary burner flame is to be discontinued. This system is also provided with a second by-pass which is bridged around all of the regulators and valves in the main line and by-pass 25. This second-by-pass comprises the pipes 28, 29 and 30 which extends from the main line to the fuel tank, and a regulator 31 which is responsive to an abnormal pressure on the fuel. This condition arises, for instance, when the fuel to the main burner flame is shut off and the pump is running, and is relieved by the by-passing of the fuel back to the tank. The regulator 31 may be of any suitable type but is preferably of the type described in connection with Fig. 11 with necessary modification to adapt it to the particular purpose. This second by-pass also includes a chamber or receptacle 32 which thus is kept supplied with fuel, and which is adapted to supply fuel for the combustion initiating or starting mechanism hereinafter described.

Figures 1, 9, 10, 11:
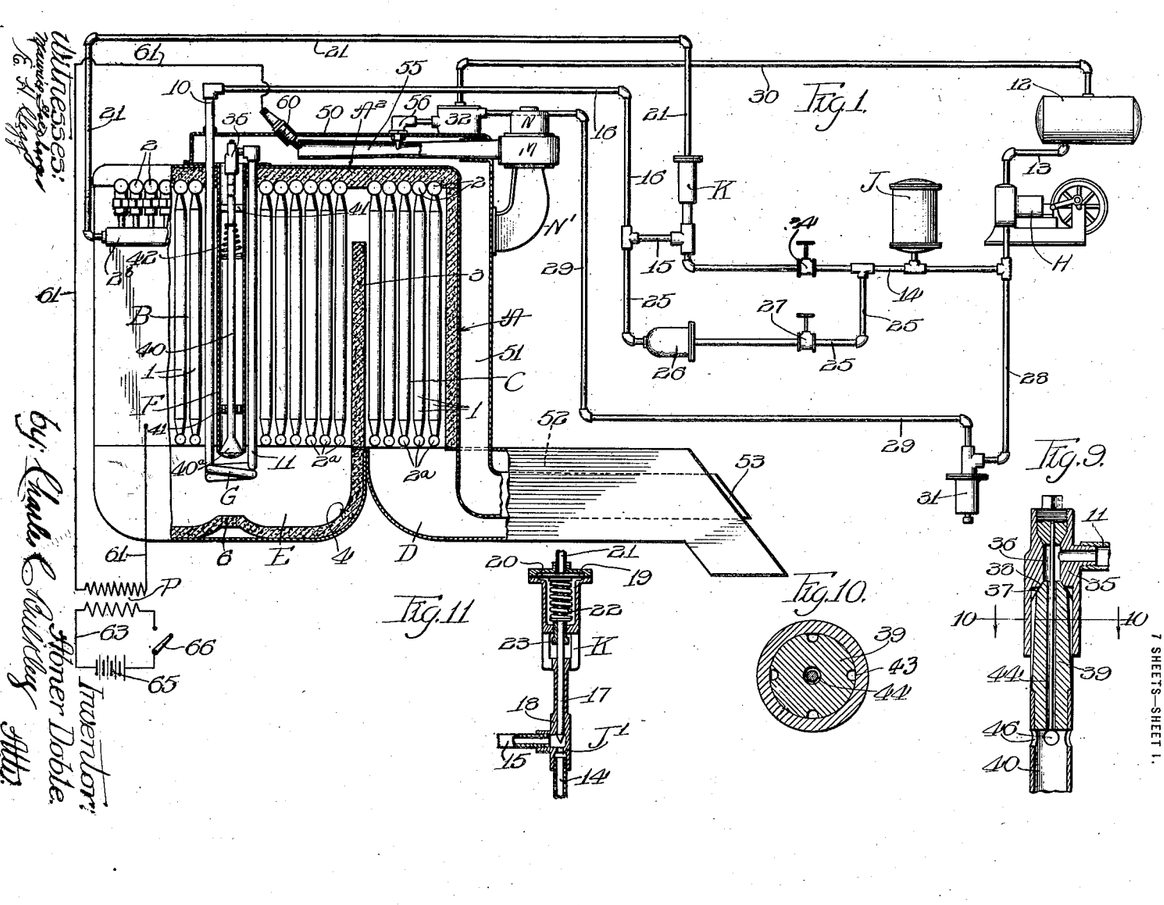
Figure 1 is a view illustrating a steam generator or boiler and fuel-vaporizing and burning apparatus, together with the means involved in the regulation and control of fuel supplied to the burner.
Fig. 9 is an enlarged detail section of the fuel-vapor valve.
Fig. 10 is an enlarged transverse sectional detail on the line 10—10 of Fig. 9.
Fig. 11 is an enlarged sectional detail of one of the automatic regulators used in the system shown in Fig. 1.

Returning now to the fuel vapor feed mechanism, it will be observed that the end of the vaporizer extension 11 is connected with a valve casing 35 which has a fuel-vapor passage 36 and a larger socket 37 communicating therewith, the shoulder 38 forming a seat for the tapered end of a valve member 39. This valve member has a long tubular extension 40 leading down the delivery tube to the lower end thereof where it carries a hollow enlargement or tapered head 40ᵃ which constitutes a cap or valve closing the lower end of the delivery tube. This valve and extension are guided for longitudinal movement in the bearings 41 in the delivery tube. A spring 42, acting on the valve extension, operates normally to keep the valve member seated on its seat 38, but the higher pressure on the fuel operates to unseat the valve and permit the fuel vapor to escape into the delivery tube through a series of grooves 43 in the valve member. This flow of vaporized fuel is varied by the movement of the valve member by reason of the fact that the grooves are inclined or tapered toward the end of the valve member. The fuel vapor thus emitted flows down the delivery tube and into the combustion chamber, drawing with it a quantity of air through the upper end of the delivery tube, and thus making a combustible mixture in the delivery tube. When the valve member is unseated, the valve head, of course, also opens the end of the delivery tube and permits the flow of mixture into the combustion chamber to supply the main burner flame. The valve member 39 also has a longitudinal passage 44 which is in constant communication with the fuel passage 36 regardless of the position of the valve member with respect to its seat. Hence, when the high pressure fuel is shut off for any reason, and the main flame extinguished, there is sufficient low pressure fuel to flow through the passage 44 and into the tubular valve extension 40 and supply the auxiliary flame which burns at the lower end of the extension, the fuel being fed thereto through a burner opening or slot 45 in the head or enlargement 40ª. The flow of fuel-vapor in this tubular extension draws into the tube a proper amount of air to form a combustible mixture in the tube, the air entering said tube through a series of holes 46 in said tube, at the end of the valve passage 44.

Figure 8:
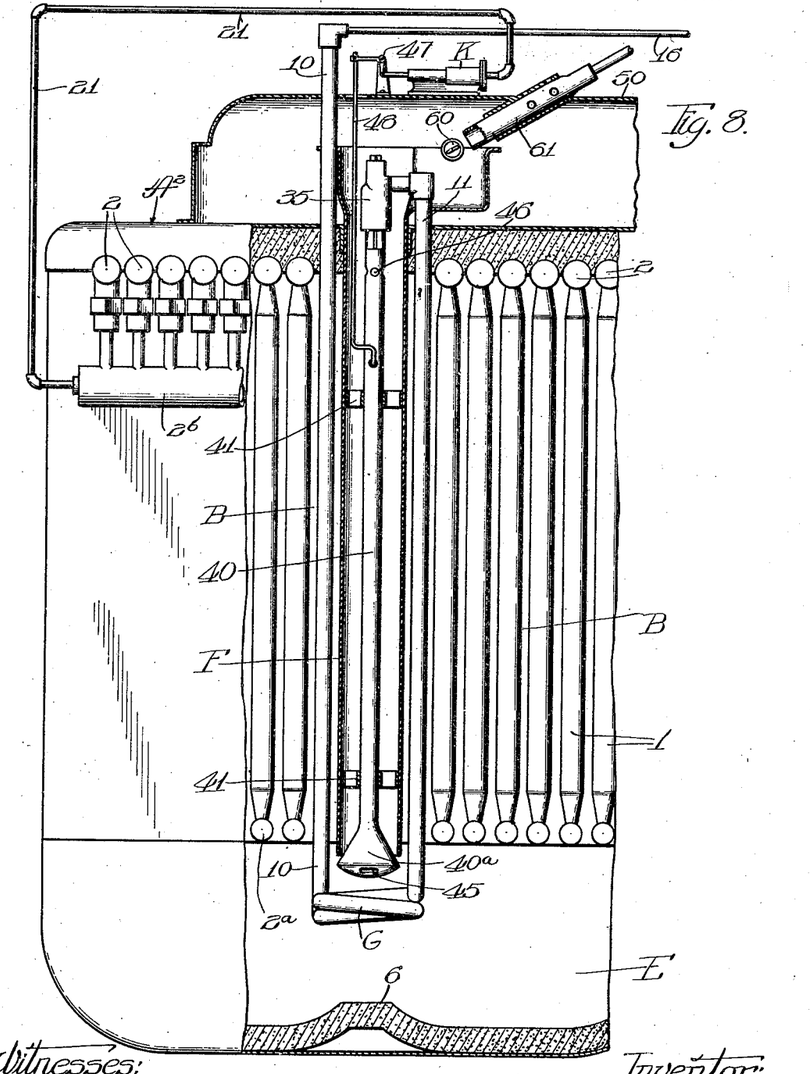
Fig. 8 is still another modification involving a different type of initial combustion mechanism used, and in which the fuel-valve mechanism is directly controlled automatically by the steam-pressure of the boiler.

In the structure of Fig. 8, the system is modified in that the steam pressure regulator K is arranged to directly actuate the valve member 39 instead of controlling the valve in the high pressure main fuel line. To this end the regulator K is mounted on the upper side of an air chamber (to be later described) directly above the delivery tube. The regulator stem is connected to a bell-crank 47 which is connected by a long link 48 to the tubular extension of the valve, and when the boiler conditions become abnormal, the regulator raises the valve member 39 against its seat 38 and thus shuts off the fuel vapor supply to the main flame.

The air which is supplied for the purpose of making a combustible mixture may be and preferably is heated in order to produce a more thorough and intimate mixture and to avoid cold air coming in contact with the heated fuel-vapor and condensing it. I take advantage of the remaining heat in the exhaust products of combustion after they leave the economizer portion of the boiler for the purpose of warming the combustion air, and in several of the structures in the drawings I have illustrated means for utilizing this exhaust heat, but it will be obvious that the same apparatus, or any other suitable means may be employed in connection with all of the structures shown.

Figure 2:
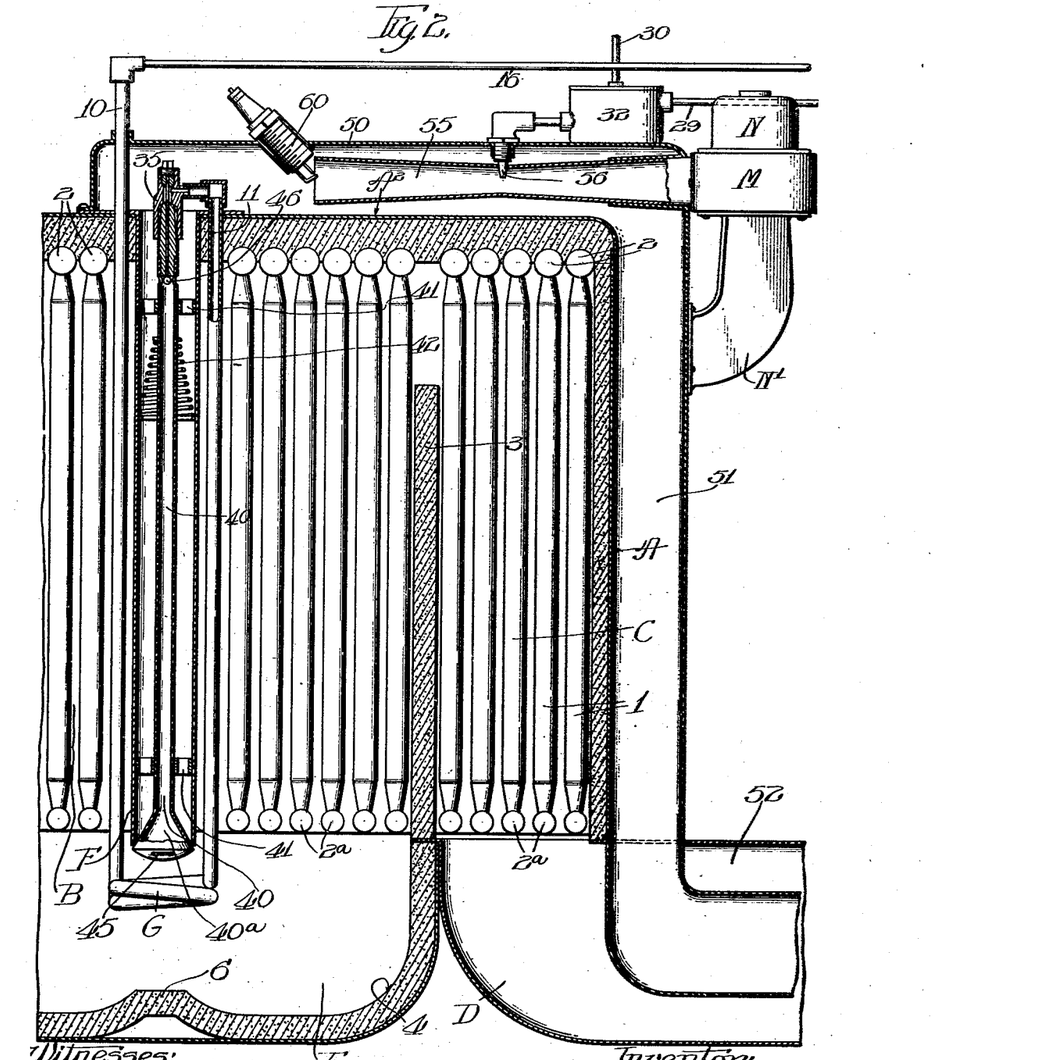
Fig. 2 is an enlarged view, partly in section, of the boiler and fuel-burning apparatus shown in Fig. 1.

Referring to Figs. 1 and 2, it will be seen that a conduit or duct 50 extends along the top of the boiler and incloses the upper end of the delivery tube so that the combustion air which passes into the delivery tube necessarily comes to it through this duct. This duct communicates with another duct 51 extending vertically along side the boiler and having its lower end 52 turned horizontally and disposed within the exhaust flue or funnel D. Its open end 53 is open to the atmosphere beyond the flue D. The air which is drawn into this duct is heated by the hot gases passing through the flue and around the end portion 52 of the air duct.

We come now to a description of the method of initially vaporizing the fuel and starting or initiating the process of combustion. In the structure shown in Figs. 1 and 2, I provide a fuel atomizing or spraying mechanism which involves a Venturi tube 55 and a fuel nozzle 56, this nozzle being connected to and receiving liquid fuel from the receptacle 32 in the second by-pass hereinbefore described. This fuel nozzle is disposed in the venturi so that when a current of air is passed through the venturi, the fuel will be drawn from the nozzle and atomizer or finely divided. The volume of air for thus spraying the fuel is supplied by a small blower or fan M of any suitable type for the purpose, this blower being preferably electrically driven by an electric motor N so that the control of the motor may be either automatic or manually controlled by the operator from his position in the seat. This blower and motor is supported by a bracket N¹ mounted on the vertical air conduit 51, and its discharge port is connected to the venturi 55. The spray of fuel from the atomizer is instantly ignited by an electric spark which is positioned in the path of the spray. A spark plug 60, preferably of the type used in internal combustion engines, is positioned at the mouth of the venturi with its sparking terminals directly in the path of the fuel spray. For the sake of convenience, the spark plug is removably mounted in a suitable socket formed in the wall of the air duct 50. This spark plug may be supplied with current in any desired manner. In Fig. 1, I have shown it as being included in the circuit 61 of the secondary winding of an ordinary induction coil P used for this purpose. The circuit 63 of the primary winding of the coil includes a battery 65 and a switch 66 by which the operator may control the sparking apparatus. The atomizing apparatus is arranged within the air duct 50 and is disposed so that the flame from the atomizer, after having been initiated by the spark, will play upon the fuel-valve casing 35 and adjacent connections and heat these parts to vaporize the fuel, this flame operating also to initially ignite the fuel vapor in the delivery tube as soon as the vapor is emitted from the valve. The process of combustion, having thus been initiated, is sustained by the continued flow of fuel through the delivery tube into the combustion chamber and thenceforth burns at the lower end of the delivery tube. The auxiliary flame is also started by this main flame and serves to re-ignite the main burner as often as becomes necessary.

Figure 3:
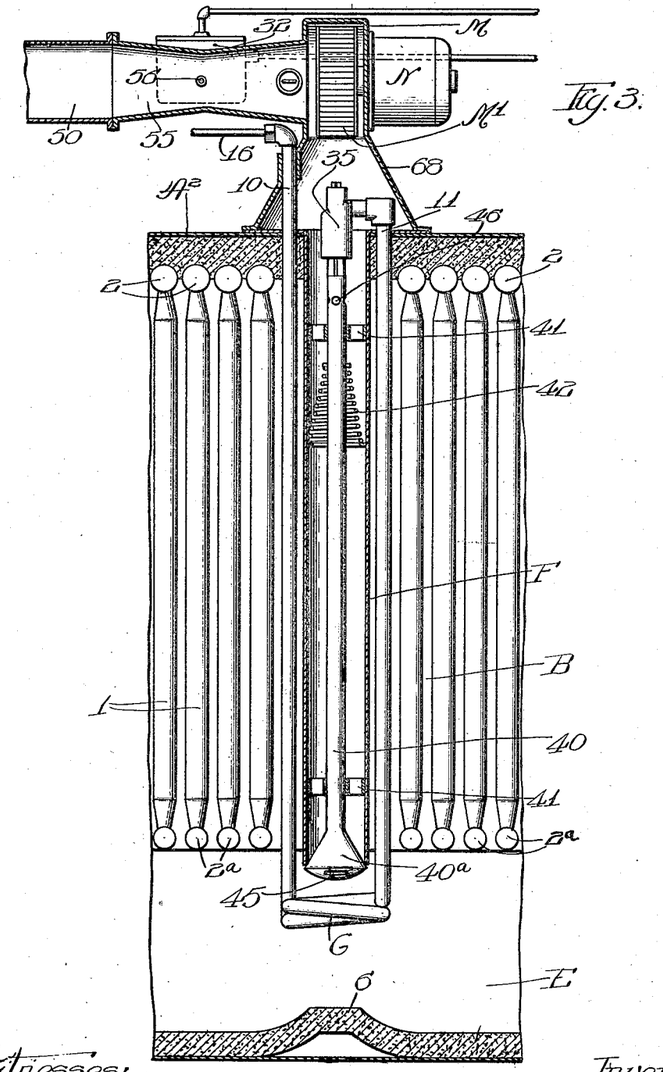
Fig. 3 is a view, partly in section, similar to Fig. 2 of a modified structure embodying my invention.

In the structure shown in Fig. 3, the air intake duct 50 for the main burner and that for the starting atomizer are combined, this duct being arranged, if desired, to connect with the vertical duct 51 leading down to the air heating device. The atomizing venturi 55 is connected between the air duct and the intake port of the blower M so that the blower draws the air through the venturi instead of blowing it therethrough, as hereinbefore described. The atomizing nozzle 56 is positioned in the venturi and takes fuel from the fuel-chamber or receptacle, and the ignition spark plug is likewise positioned with its terminals in the path of the spray from the nozzle in the same relation. The discharge outlet of the blower is connected to the upper end of the delivery tube F, and for the sake of convenience the blower outlet 68 is enlarged to form a support for the blower and its driving motor. Thus in the operation of this mechanism, the fuel-spray is ignited by the spark and blown by the blower through its fan wheel $M^1$ and into the delivery tube where it ignites the fuel mixture therein. After the ignition flame and the blower is discontinued, the main burner draws its air through the venturi and blower.

Figure 4:
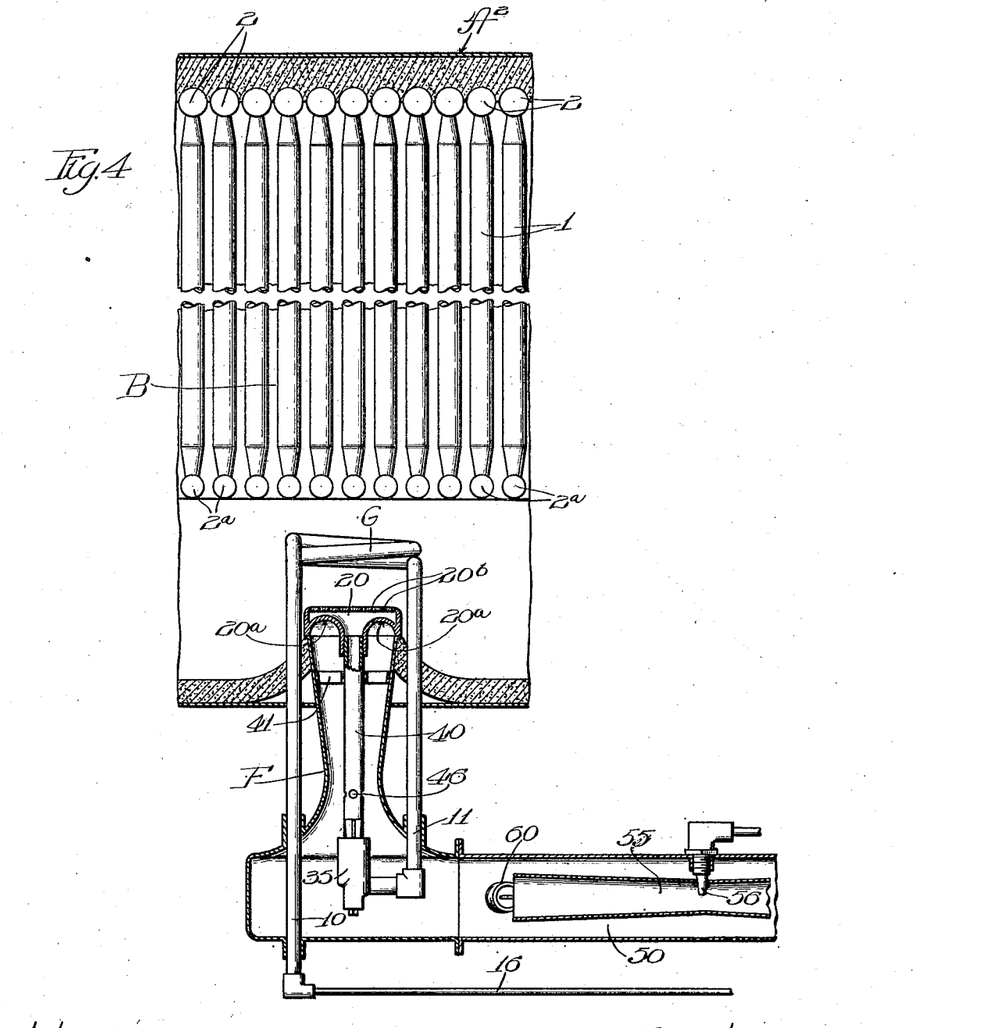
Fig. 4 is a sectional view of another modification in which the fuel-burning apparatus is disposed entirely beneath the boiler.

In the structure of Fig. 4, the entire mechanism is positioned below the boiler and enters the combustion hearth from below. The delivery tube F is positioned in an opening in the raised portion of the combustion hearth, and the vaporizer G is positioned just above the end thereof with its two extensions 10 and 11 extending downwardly therefrom and connected respectively to the fuel-supply pipe and to the valve casing 35. The valve and its hollow extension are of the same construction as described in connection with Figs. 1 and 2, except that the valve head or enlargement 20 is arranged as a cap over the end of the delivery tube, and its inner surfaces $20^a$ are curved so as to deflect the fuel mixture onto the bottom wall of the combustion hearth when the head is raised to provide a space between itself and the end of the delivery tube. Here gravity is relied upon to seat the fuel-vapor valve, the weight of the valve member and its parts being made heavy enough in proportion, although spring mechanism may be used for this purpose, if desired. The valve head 20 has a plurality of fine holes $20^b$ for the auxiliary flame instead of slots 45. The air intake duct 50 incloses the lower end of the delivery tube and, although not shown, is intended to be connected to the air heating mechanism, as hereinbefore described in connection with Figs. 1 and 2. The atomizer venturi is positioned within the air duct and is intended to be connected to the blower for its supply of air, as hereinbefore described.

Fig. 8 illustrates a structure in which a different ignition initiating device is used. Instead of a fuel-atomizing mechanism, I employ a torch 61 which is intended to utilize acetylene gas or other suitable gas which may be contained in a suitable receptacle under compression. This torch is mounted so as to direct its flame upon the fuel-vapor valve for heating said parts and vaporizing the fuel. The torch is initially ignited by an electric spark from the plug in the same manner as the fuel spray from the atomizer.

Figure 5:
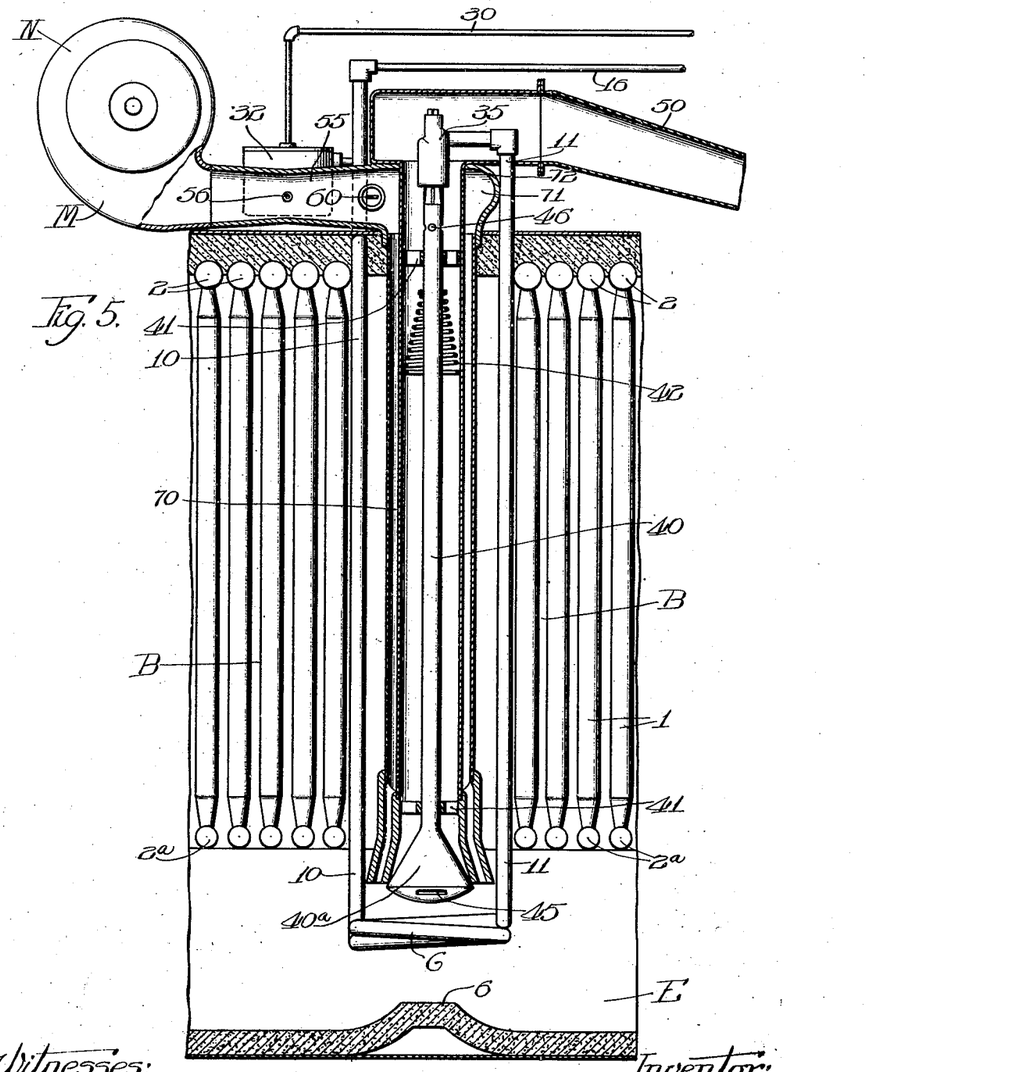
Fig. 5 is a similar section of a modified structure in which the initial combustion mechanism is provided with a separate passage leading to the combustion chamber.
Figures 6, 7:
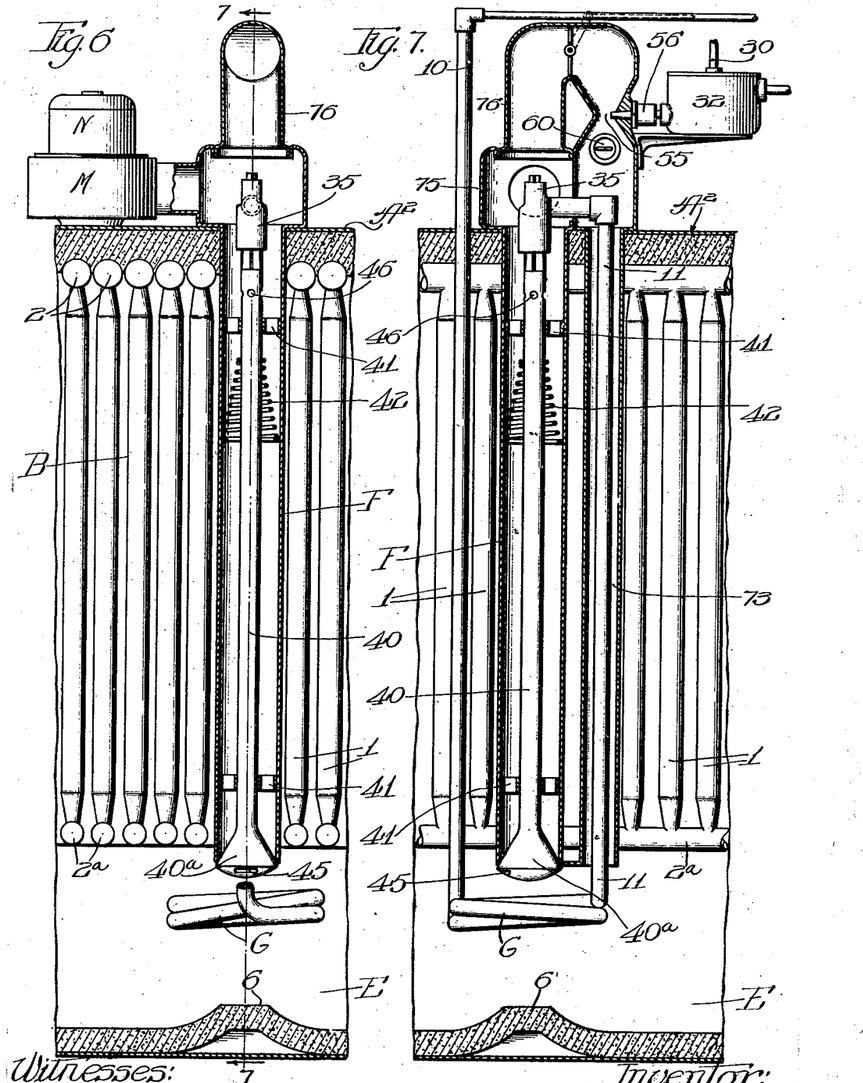
Fig. 6 is still another modification of the type of structure shown in Fig. 5.
Fig. 7 is a sectional view on the line 7—7 of Fig. 6.

The structures shown in Figs. 5, 6 and 7, involve the initial ignition of the main flame in the combustion chamber at the lower end of the delivery tube instead of at the upper end thereof, and in carrying out this idea I provide passages independent of the delivery tube for the starting flame. In Fig. 5, this passage is in an annular chamber 70 surrounding the delivery tube and communicating with an independent chamber 71 at the upper end thereof, this chamber 71 being formed by a casing 72 which surrounds the upper end portion of the delivery tube F although not in communication therewith. The atomizing venturi 55 is connected with this chamber 71 to direct the fuel spray thereinto, and the blower M is positioned with its discharge outlet in communication with the other end of the venturi. The spray nozzle 56 is positioned in the venturi and receives fuel from the fuel receptacle. The spark plug is located in the path of the spray. Thus under the action of the blower, the atomized fuel, after having been ignited by the spark, is blown through the chamber 71 and down through the annular chamber 70 and burns at the lower end thereof where said annular chamber opens into the combustion chamber. This ignition or starting flame plays upon the vaporizer G until it becomes heated and the fuel therein vaporized, whereupon the vaporized fuel mixture coming from the delivery tube will be ignited at the lower end thereof. This structure has the advantage of applying the initial heat directly to the vaporizer coil G. In the structures shown in Figs. 6 and 7, the extension 11 of the vaporizer is inclosed in a separate tubular chamber or passage 73, the lower end of which opens into the combustion zone, and the upper end of which is in direct communication with the Venturi atomizer 55, so that the starting flame therefrom heats the vaporizer extension 11 for its entire length and burns at the lower end of said passage 73 in position to ignite the vaporized fuel mixture from the delivery tube F. In this construction, the blower M may be utilized not only to supply air for the starting atomizer, but also to supply air to the delivery tube if desired. I provide an air chamber 75 at, and in communication with, the upper end of the delivery tube F and connect the blower discharge outlet thereto. Leading from this chamber is a duct 76 which conveys air therefrom to the intake end of the Venturi tube 55. The fuel nozzle 56 and the igniter or spark plug are located in the venturi in their respective positions, as hereinbefore described.

I claim:

1. The combination of a combustion hearth, and fuel burning mechanism for directing the fuel upon said hearth, embodying a fuel mixing tubular member positioned to direct fuel mixture into the zone of said hearth, a fuel vapor releasing mechanism operable by a predetermined fuel pressure to admit fuel vapor to said mixing tubular member and having independent means for admitting fuel at a lower pressure to an auxiliary flame, a vaporizer connected with said releasing mechanism and in position to be acted upon by said main and auxiliary flames, and means for supplying liquid fuel to said vaporizer at different pressures.

2. The combination of a source of liquid fuel under relatively high pressures, a fuel burner having a main nozzle and an auxiliary nozzle; a mixing chamber associated with each nozzle, a vaporizer connected to said source of fuel and positioned to be heated by the flame from both of said nozzles, a valve mechanism connected with said vaporizer and responsive to the high pressure on said fuel to admit vaporized fuel to the mixing chamber for said main nozzle, a by-pass in said valve mechanism for admitting vaporized fuel to the mixing chamber for said auxiliary nozzle, and means in said by-pass for supplying fuel under relatively low pressure to said auxiliary nozzle.

3. The combination of a relatively high pressure system of liquid fuel supply, means for reducing the pressure to supply fuel at relatively low pressure, a fuel burner having a main nozzle and an auxiliary nozzle, and valve mechanism arranged to continuously admit the fuel to the auxiliary nozzle and having means responsive only to said high pressure for admitting fuel to said main nozzle.

4. The combination of a relatively high pressure system of liquid fuel supply, means for reducing the pressure to supply fuel at relatively low pressure, a fuel burner having a main nozzle and an auxiliary nozzle, valve mechanism arranged to continuously admit the fuel to the auxiliary nozzle and having means responsive only to said high pressure for admitting fuel to said main nozzle, and a vaporizer for the fuel positioned to be heated by the flame from both nozzles of said burners and connected with said fuel supply and said valve mechanism.

5. The combination of a relatively high pressure system of liquid fuel supply, means for reducing the pressure to supply fuel at relatively low pressure, a fuel burner having a main nozzle and an auxiliary nozzle, valve mechanism constantly admitting the fuel to the auxiliary nozzle and having means responsive only to said high pressure for admitting fuel to said main nozzle, and a hearth member forming a combustion zone and positioned to receive the burning fuel upon its surface.

6. The combination of a relatively high pressure system of liquid fuel supply, means for reducing the pressure to supply fuel at relatively low pressure, a main and an auxiliary nozzle for the fuel, valve mechanism constantly admitting fuel to the auxiliary nozzle and having means responsive only to said high pressure for admitting fuel to said main nozzle, and ignition mechanism for initially igniting the burners.

7. The combination of a steam generator, a main nozzle for heating said generator, an auxiliary nozzle, a vaporizer for vaporizing the fuel for both nozzles, means for constantly supplying fuel to said auxiliary nozzle at relatively low pressure, a valve mechanism having a normal opening for the fuel constantly in communication with said auxiliary nozzle and means responsive to a relatively high pressure on the fuel for controlling the fuel to the main nozzle, and means responsive to abnormal steam generator conditions for cutting off the supply of fuel to said main nozzle.

8. The combination of a combustion hearth arranged to form a combustion zone for the burning of fuel, a source of relatively high pressure liquid fuel, a source of relatively low pressure liquid fuel, a vaporizer connected with both sources of fuel and positioned in the combustion zone, a main nozzle arranged to play vaporized fuel upon said combustion hearth, an auxiliary nozzle connected with said source of low pressure fuel and constantly supplied thereby and in position to heat said vaporizer, and a valve responsive only to said relatively high pressure for admitting vaporized fuel to the main nozzle.

9. The combination of a combustion hearth arranged to form a combustion zone for the burning of fuel, a source of relatively high pressure liquid fuel, a source of relatively low pressure liquid fuel, a vaporizer connected with both sources of fuel and positioned in the combustion zone, a main nozzle arranged to play vaporized fuel upon said combustion hearth, an auxiliary nozzle connected with said source of low pressure fuel and constantly supplied thereby and in position to heat said vaporizer, a valve responsive only to said relatively high pressure for admitting vaporized fuel to the main nozzle, a steam generator subject to the heat of said nozzles and combustion hearth, and an automatic cut-off responsive to boiler conditions for regulating the supply of relatively high pressure fuel to said main nozzle.

10. The combination of a main and auxiliary nozzle, a source of relatively high pressure liquid fuel for supplying said main nozzle, means for reducing the pressure to supply fuel at relatively low pressure to said auxiliary nozzle, and an automatic regulator controlling the supply of relatively high pressure fuel to said main nozzle.

11. The combination of a main and auxiliary nozzle, a source of relatively high pressure liquid fuel for supplying said main nozzle, means for reducing the pressure to supply fuel at relatively low pressure to said auxiliary nozzle, an automatic regulator controlling the supply of relatively high pressure fuel to said main nozzle, and a fuel vaporizer subject to the heat of both nozzles and common to both of said nozzles.

12. The combination of a main and auxiliary nozzle, a source of relatively high pressure liquid fuel for supplying said main nozzle, means for reducing the pressure to supply fuel at relatively low pressure to said auxiliary nozzle, an automatic regulator controlling the supply of relatively high pressure fuel to said main nozzle, a steam generator subject to the heat of said main nozzle, and an automatic regulator responsive to abnormal steam pressure in said generator for regulating the supply of fuel to said main nozzle.

13. The combination of a mixing tube, a valve member positioned therein and responsive to a predetermined fuel pressure to admit fuel to said mixing tube, a hollow extension for said valve member having a head at its end coöperating with said tube to form a main burner, said head having openings therein through which the fuel passes to form an auxiliary burner, a source of relatively high pressure fuel supply controlled by said valve, and a source of relatively low pressure fuel supply constantly connected with said hollow valve extension.

14. The combination of a mixing tube, a valve member positioned therein and responsive to a predetermined fuel pressure to admit fuel to said mixing tube, a hollow extension for said valve member having a head at its end coöperating with said tube to form a main burner, said head having openings therein through which the fuel passes to form an auxiliary burner, a source of relatively high pressure fuel supply controlled by said valve, a source of relatively low pressure fuel supply constantly connected with said hollow valve extension, and ignition mechanism arranged to initially heat the fuel of said burners and initially ignite said main burner.

15. The combination of a burner, a source of liquid fuel supply therefor, a vaporizer for the fuel subject to the heat of said burner, means for initially vaporizing and igniting the fuel comprising a Venturi fuel atomizer arranged to play its flame upon said burner parts, a blower for operating said atomizer and an electric sparking apparatus arranged to ignite the spray from said atomizer.

16. The combination of a burner, a source of liquid fuel supply therefor, a vaporizer for the fuel subject to the heat of said burner, means for initially vaporizing and igniting the fuel embodying a liquid fuel atomizer positioned to heat said burner parts, and an electric sparking apparatus for igniting a spray from said atomizer.

17. The combination of a burner mechanism, a source of liquid fuel supply therefor, a vaporizer for the fuel subject to the heat of said burner, initial vaporizing and ignition mechanism embodying a venturi positioned to direct a flame upon said burner parts, a fuel nozzle positioned within said venturi, a blower connected with said venturi for spraying the fuel, and an electric sparking device positioned to ignite the fuel spray.

18. The combination of a burner mechanism, a source of liquid fuel supply therefor, a vaporizer for the fuel subject to the heat of said burner, initial vaporizing and ignition mechanism embodying a venturi positioned to direct a flame upon said burner parts, a fuel nozzle positioned within said venturi, a blower connected with said venturi for spraying the fuel, an electric sparking device positioned to ignite the fuel spray, and means for supplying heated air to said burner.

19. The combination of a source of relatively high fuel pressure, a burner having valve mechanism responsive to said pressure for admitting fuel to the burner, a steam generator subject to the heat of the burner, and an automatic regulator responsive to generator conditions for controlling the fuel to said valve.

20. The combination of a steam generator, a main burner for heating said generator, an auxiliary burner, a fuel vaporizer for the fuel of both burners, a source of relatively high pressure connected to said vaporizer for supplying fuel to the main burner, means for reducing the pressure and supplying fuel constantly to the auxiliary burner, an initial ignition device for said burners, and means for automatically supplying fuel to the ignition device from said source of high pressure.

Signed by me at Chicago, Illinois, this 23rd day of Nov., 1916.

ABNER DOBLE.

Witnesses:
E. H. CLEGG,
AMY JEHLE.